J. PORTEOUS.
ROTARY HARROW.
APPLICATION FILED MAR. 13, 1919.

1,339,605.

Patented May 11, 1920.

INVENTOR
James Porteous
BY
Francis C. Huebner,
ATTORNEY

UNITED STATES PATENT OFFICE.

JAMES PORTEOUS, OF FRESNO, CALIFORNIA.

ROTARY HARROW.

1,339,605.  Specification of Letters Patent.  Patented May 11, 1920.

Application filed March 13, 1919. Serial No. 282,438.

*To all whom it may concern:*

Be it known that I, JAMES PORTEOUS, a citizen of the United States, and a resident of the city of Fresno, in the county of Fresno and State of California, have invented a new and useful Improvement in Rotary Harrows, of which the following is a specification.

The device herein described is an improvement on the patent granted to me January 17, 1911, No. 982,091, revolving harrows.

Figure 1:
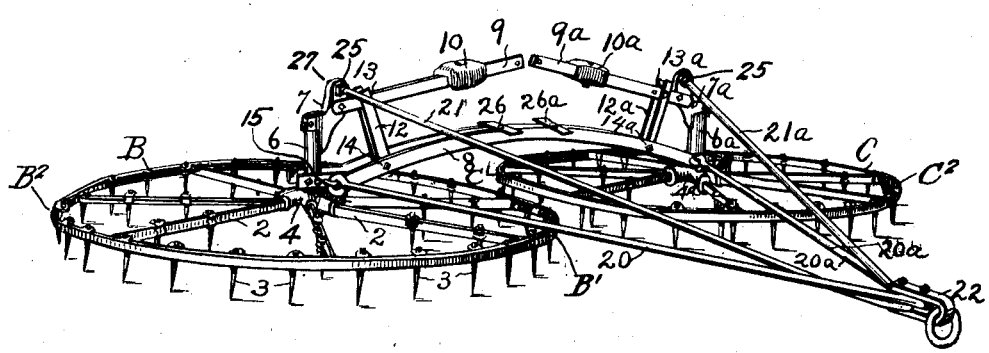
Figure 2:
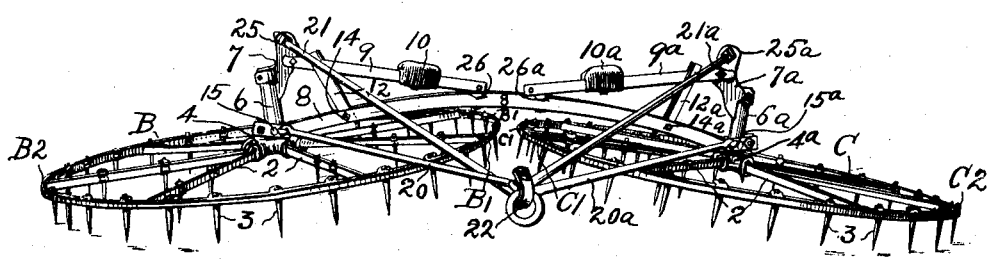
Figure 3:
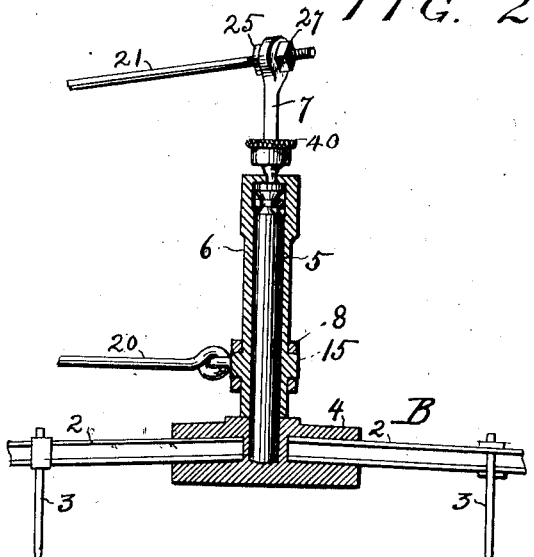
Figure 4:
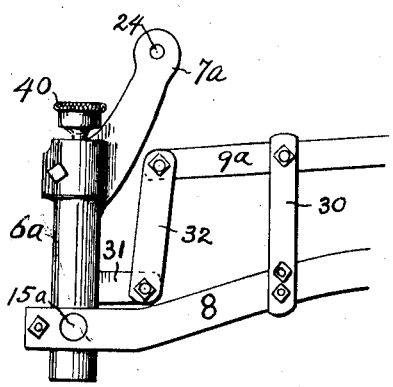

My invention relates to a rotary harrow especially designed for use in orchards and vineyards for harrowing the ground between the rows of trees or vines, which can be made to rotate in a direction which will prevent barking the trunks of the trees or vines, and which can be set to run approximately evenly along the ground and when the harrow is drawn under low hanging branches it is not obstructed thereby. I accomplish this and other objects hereinafter referred to by means of the device described in the accompanying drawings in which Figure 1 shows a perspective view of the harrow complete. Fig. 2 is a view similar to Fig. 1, indicating the position of the harrow when dragged along a ridge, and showing the stops for preventing the rotatable portion of the harrow from hitting the arch. Fig. 3 is a sectional view of the vertical axle and boxing. Fig. 4 is a modified view of a toggle lever the equivalent of a portion of the device shown in Figs. 1 and 2. In said drawings B and C are two circular harrows having radial spokes 2 and a plurality of teeth 3. 4 and $4^a$ are hubs in the center of harrows B and C. In these hubs vertical axles 5 and $5^a$ are attached or may be formed integral therewith, said axles being constructed to revolve within boxings 6 and $6^a$. These axles should be long enough to control rocking movements of the wheel portion of the harrow made possible by the weighted lever hereinafter referred to. 8 is an arched truss or tie brace at the ends of which the axle boxings 6 and $6^a$ are pivoted at 15 and $15^a$. This truss is shaped at each end in the form of a yoke which passes on two sides of boxings 6 and $6^a$. By this structure the harrows can have a rocking movement in line with the truss, but transversely thereto they are held rigid. 9 and $9^a$ are weight levers pivoted at one end thereof to the lugs 7 and $7^a$. These lugs are formed integral with boxings 6 and $6^a$. 10 and $10^a$ are weights on levers 9 and $9^a$ and are adjustable thereon. 12 and $12^a$ are toggle braces, which act as rocking fulcrums for the levers 9 and $9^a$.

Fulcrum 12 is pivoted at one end to arch 8 with pivot 14 and at the other end to lever 9 with pivot 13. Fulcrum $12^a$ is pivoted at one end to lever $9^a$ with pivot $13^a$ and at the other end to arch 8 with pivot $14^a$. The toggle braces or fulcrums 12 and $12^a$ should be of such length that an obtuse angle is formed by toggle braces 12 and $12^a$ with the ends of weight levers 9 and $9^a$ adjacent to lugs 7 and $7^a$, when said levers 9 and $9^a$ are approximately in a horizontal position. 20 and $20^a$ are pull rods extending from near the junction of the arch 8 with boxings 6 and $6^a$ and are preferably fastened with eye bolts to form a universal joint. These rods join at a common point to clevis 22 forming a hinged connection. 21 and $21^a$ are adjustable rods extending from clevis 22 to lugs 7 and $7^a$. 24 are holes through lugs 7 and $7^a$ through which rods 21 and $21^a$ pass. These rods are threaded and have nuts 25 and 27 on each side of lugs 7 and $7^a$. When the clevis is attached to a tractor the harrow is adjusted to drag parallel with the ground by lengthening or shortening rods 21 and $21^a$. The rods are locked in this position by the nuts 25 and 27. 26 and $26^a$ are bumpers arranged on arch 8 so that the ends of weight levers 9 and $9^a$ will limit the tilting of the harrows and prevent the wheels or rotatable parts thereof from striking the arch.

In the use of this harrow it will be noted that from the approximate center of each of the circular harrows to the outside of the cut of the harrow there are no overhanging parts or machinery and those parts of the harrow can easily be dragged under the overhanging branches of trees and vines without damage to the branches. It is also noted as one of the objects of my invention that the weights 10 and $10^a$ will, by the arrangement of levers described, press the outside ends of the harrow, $B^2$ and $C^2$ into the ground slightly deeper than the inside portions $B^1$ and $C^1$, thus not only harrowing deeper near the outside of the draft of the harrow, and next to the vines, but causing the harrows to rotate in the same directions they would if the weighted levers were extending outwardly from the center of the harrow and attached directly to the boxing. It will be noted that leaving the weight on the left side of the harrow will cause it to revolve in the opposite direction than the harrow described in my Patent No. 982,091 referred to herein. If the harrow be dragged between two rows of trees or vines, the portions of the harrows next adjacent to the trees or vines will roll in the opposite direction toward which the harrow is moving, and if the harrow should come in close proximity to a tree or vine it will roll around it and not rub it so as to injure the tree or tear the bark. The object in having the levers and weights in the space between the centers of the harrows is to prevent interference of such levers and weights with overhanging branches, and the object of connecting the harrows with an arch or its equivalent is to permit each of the harrows to tilt, so that the outside portions will sink deeper into the ground than the inside portions and will work on uneven ground, and at the same time to have the truss attached to the boxings adjacent to the hub. By placing the weight levers to force the harrows to rotate in a direction so that the portions nearest each other will have a forward movement, the clods and debris which would otherwise be clamped between the harrows and prevent their rotating will be thrown toward the outside portions of the harrow and the harrow is at all times kept clean. A plurality of harrows can be thus connected as well as two of them.

Fig. 4 shows an equivalent of the device for tilting the harrow described above, 6ª being the boxing, 8 an end of the arch truss, 9ª a weighted lever, 30 a fulcrum attached rigidly to arch 8 to which weight lever 9ª is pivoted, 31 is a lug on boxing 6ª, and 32 is a toggle lever pivoted at one end to lug 31 and at the other end to weight lever 9ª. 40 is a grease cup.

I claim as new and ask for Letters Patent upon:

1. In a device of the character described two rotary harrows having vertical axles at the center thereof, boxings within which the axles can rotate, an arched truss pivotally attached to and connecting said boxings, pull rods, one of which is attached at the lower end and one at the upper end of each of the boxings and which meet at an approximately common point, substantially as described.

2. In a device of the character described two rotary harrows having vertical axles at the center thereof, boxings within which the axles can rotate, an arched truss pivotally attached to and connecting said boxings, pull rods one of which is hinged at the lower end and one rigidly attached at the upper end of each of the boxings and which are pivoted at a common point, one of the rods attached to each of the boxings being adjustable as to its length, substantially as described.

3. In a device of the character described two rotary harrows having vertical axles at the center thereof, boxings within which the axles can rotate, an arched truss pivotally attached to and connecting said boxings, pull rods one of which is attached at the lower end and one at the upper end of each of the boxings and which meet and are pivoted at a common point, said rods being adjustable as to length, substantially as described.

4. In a tool of the character described the combination of two rotary harrows having vertical axles at the approximate center thereof, boxings covering said axles and arranged so that the axles can rotate therein, an arched truss pivotally connecting the boxings, levers pivoted at the upper end of the boxings and disposed to swing on an approximately common plane with the truss, adjustable weights on the levers and rocking fulcrums each of which is pivoted at one end to the arch and the other end to one of said levers substantially as described.

5. In a device of the character described two rotary harrows, each having a rocking boxing hinged at the lower end to a frame in such manner that the harrows can rock at right angles to the line of draft and at the top attached to a threaded rod by adjustable nuts by which the harrows can be held rigidly level to the ground in said line of draft.

6. In a tool of the character described rotary harrows having the rocking boxings hinged at their lower end to a truss in such a manner that they can rock at right angles to the line of draft, which rocking motion is controlled by a weighted lever, and at the top attached to threaded rods by adjustable nuts by which the harrows can be held rigidly level to the ground in said line of draft when the harrow is attached to a tractor.

7. In a tool of the character above described two rotary harrows having vertical axles rotatable in independent boxings the boxings being hinged at their lower end to a frame in such a manner that the harrows can rock at right angles to the line of draft and at the top attached to threaded rods by adjustable nuts by which the harrows can be adjusted to and held rigidly level to the ground in said line of draft, when the harrow is attached to a tractor, and still allow the harrow to rock at right angles to the line of draft, said threaded rods being hinged together to allow the rocking boxings to play when the harrow is going over ground which is more or less crowned between the rows.

8. The combination of two circular harrows each having a vertical axle, boxings in which the axles rotate, a truss pivotally connected with the boxings, toggle levers pivoted near the upper end of the boxings and to the truss, and extending along the truss, and a weight on the end of the lever opposite the boxings.

9. In a tool of the character described the combination of two circular harrows each having a vertical axle near the center, boxings in which the axles can rotate, and a truss hinged at each end to the boxings, said hinge being constructed to permit the harrows to independently rock in line with the truss.

10. In a tool of the character described the combination of two circular harrows having upright axles near the center, boxings in which the axles can rotate, a truss hinged at each end to one of the boxings, a lug on the upper end of each boxing lined approximately with the truss, a lever pivoted at one end to the lug and extending toward the lug on the other boxing, a rocking fulcrum pivoted on each lever between the ends and to the truss and bumpers on the truss spaced to limit the rocking movement of the harrows.

11. In a tool of the character described the combination of two circular harrows, each having an upright axle near the center thereof, boxings in which said axles can rotate, a truss hinged at each end to one of said boxings, rocking fulcrums pivoted to the truss, and a lever pivoted at one end to the upper end of each boxing, an adjustable weight on the other end, said fulcrums being pivoted between the ends substantially as described.

12. In a tool of the character described, the combination of two rotary harrows connected with a truss, and a weighted lever pivotally connected with the truss and adapted to normally press into the ground that portion of the harrow opposite to the portion under the weight.

13. In a device of the character described the combination of two rotary harrows each having a vertical axle inclosed in an independent boxing, a truss connecting the boxings, by pivots arranged so that the harrows can rock in line with the truss but not at right angles thereto.

JAMES PORTEOUS.

Witnesses:
CLEO K. CURTIS,
S. L. WALKER.